United States Patent [19]
Chapnik et al.

[11] Patent Number: 5,982,529
[45] Date of Patent: Nov. 9, 1999

[54] APPARATUS FOR REDUCING LINEAR ARTIFACTS IN AN OPTICALLY-PRINTED IMAGE

[75] Inventors: Philip D. Chapnik, Newton; Bruce K. Johnson, North Andover, both of Mass.

[73] Assignee: Polaroid Corporation, Cambridge, Mass.

[21] Appl. No.: 08/931,732

[22] Filed: Sep. 16, 1997

[51] Int. Cl.[6] .............................. B41J 2/445; G02B 26/02; G02F 1/133

[52] U.S. Cl. .......................... 359/243; 359/254; 359/259; 359/316; 359/320; 349/3; 349/66; 349/73; 349/74; 349/75

[58] Field of Search .............................. 349/66, 3, 73-75; 359/243, 254, 259, 316, 320

[56] References Cited

U.S. PATENT DOCUMENTS

| 4,887,104 | 12/1989 | Kitano et al. | 350/355 |
| 5,450,230 | 9/1995 | Masuda et al. | 359/254 |
| 5,515,097 | 5/1996 | Munechika et al. | 347/241 |
| 5,708,486 | 1/1998 | Miyawaki et al. | 349/44 |

FOREIGN PATENT DOCUMENTS 0 314 187  2/1991  European Pat. Off. .

OTHER PUBLICATIONS

Patent Abstracts of Japan vol. 017, No. 143 (P–1507) Mar. 23, 1993 & JP 04 317040 A (Brother Ind Ltd), Nov. 9, 1992 see abstract.

Nagata M et al. "Liquid crystal shutters for printers" Molecular Crystals and Liquid Crystals, 1986, UK vol. 139 No. 1–2 pp. 143–160 XP002087240.

*Primary Examiner*—Georgia Epps
*Assistant Examiner*—Margaret Burke
*Attorney, Agent, or Firm*—Barry Gaiman; Joseph Stecewycz

[57] ABSTRACT

A spatial light modulator for use in a optical printer where the spatial light modulator includes a plurality of cells, having a shape that is defined to decrease artifacts in an image produced on a recording medium by the optical printer. The shape of the plurality of cells merges a portion of the optical radiation passing through an individual cell of the spatial light modulator with optical radiation from that of adjacent cell to form a pixel on the recording medium. In one implementation each of the cells of the spatial light modulator independently modulate the optical radiation so as to print horizontally-displaced pixels. When LEDs are used as the colored light source, the light is either first diffused to minimize shadows from electrical contacts on the LEDs, thus removing linear artifacts in the image.

16 Claims, 13 Drawing Sheets

# APPARATUS FOR REDUCING LINEAR ARTIFACTS IN AN OPTICALLY-PRINTED IMAGE

BACKGROUND OF THE INVENTION

1. Field of the Invention

The present invention relates to optical printing systems and, more particularly, to a line-scanning optical printing system comprising a spatial light modulator configured to produce printed images without generating linear artifacts.

2. Description of the Prior Art

Conventional optical printers typically utilize an optical radiation source emitting one or more beams of visible, ultra-violet, or infra-red radiation which may be modulated by means of a spatial light modulator (SLM) before being projected onto a radiation-sensitive medium. In such printers, the SLM is used to produce sequential portions of the desired image on the medium, typically line-by-line, as the medium is scanned or translated relative to the beam of optical radiation. For color images, the optical radiation may be provided by means of colored light sources, such as light emitting diodes (LEDs), or by means of a polychrome light source in combination with color filters.

In many applications, the SLM comprises a linear array of liquid-crystal device (LCD) shutters or cells. Any cell in the SLM can be addressed to change its transmissiveness so as to transmit some or all of the incident radiation to form an individual pixel in the image, the transmitted portion being projected onto the radiation-sensitive medium. Because of the characteristics of LED radiation sources and the transmissive geometry of conventional LCD cells, there often results linear artifacts in the printed image. These linear artifacts may take the form of dark lines extending both parallel to and orthogonal to the direction of scanning.

Accordingly, it is an object of this invention to provide an SLM configured so as to minimize or eliminate the generation of linear artifacts in a printed image. Other objects of the invention will be obvious, in part, and, in part, will become apparent when reading the detailed description to follow.

SUMMARY OF THE INVENTION

The aforementioned and other objects are achieved by the invention which discloses an SLM for use in an optical printer which prints on a photosensitive medium. The SLM generally comprises a plurality of cells where each of the cells is independently controllable by circuitry external to the SLM. The plurality of cells are used to modulate optical radiation passing therethrough such that pixels are imaged onto the photosensitive media thereby forming an image.

The plurality of cells each have a shape that acts to intermingles optical radiation from a first cell with optical radiation from one or more adjacent cells. In the preferred embodiment, the shape is a parallelogram. The LEDs may be encased within an optical waveguide, or lightpipe, having a diffuser at its terminus. In an alternative embodiment, the LEDs are vertically displaced relative to one another by a predetermined amount. Other features of the invention will be readily apparent when the following detailed description is read in connection with the drawings.

BRIEF DESCRIPTION OF THE DRAWINGS

The structure and operation of the invention, together with other objects and advantages thereof, may best be understood by reading the detailed description to follow in connection with the drawings in which.

DESCRIPTION OF THE PREFERRED EMBODIMENTS

While the present invention retains utility within a wide variety of optical devices and may be embodied in several different forms it is advantageously employed in connection with an optical printer system wherein the system comprises one or more LEDs as a source of optical radiation and an SLM comprising an array of liquid crystal cells, or shutters. Although this is the form of the preferred embodiment and will be described as such, this embodiment should be considered as illustrative and not as restrictive.

Background of the Invention

Figure 1:
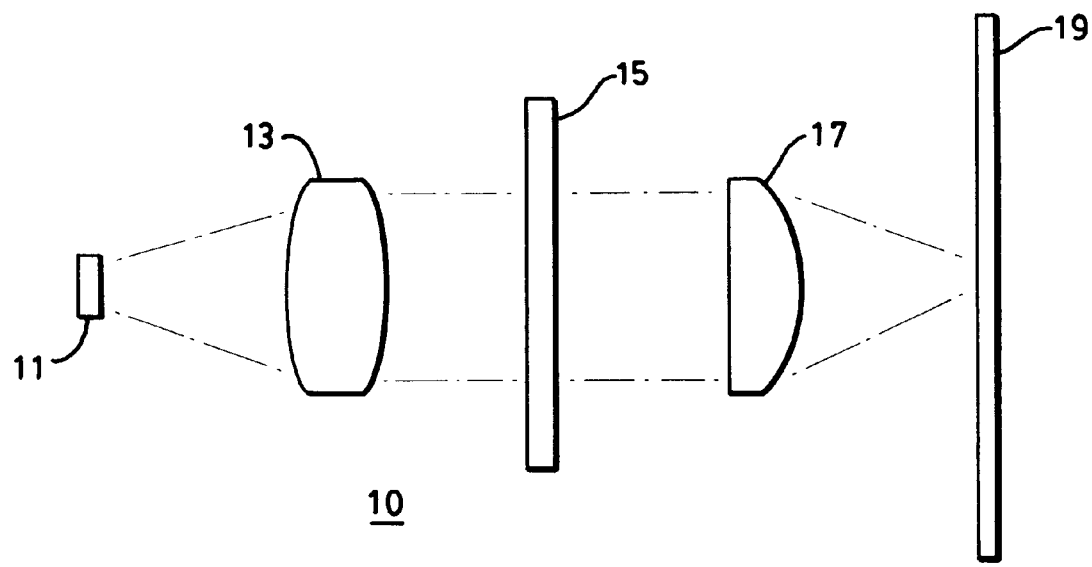
FIG. 1 is a diagrammatical view of the optical system of a conventional optical printing system.
Figure 2:
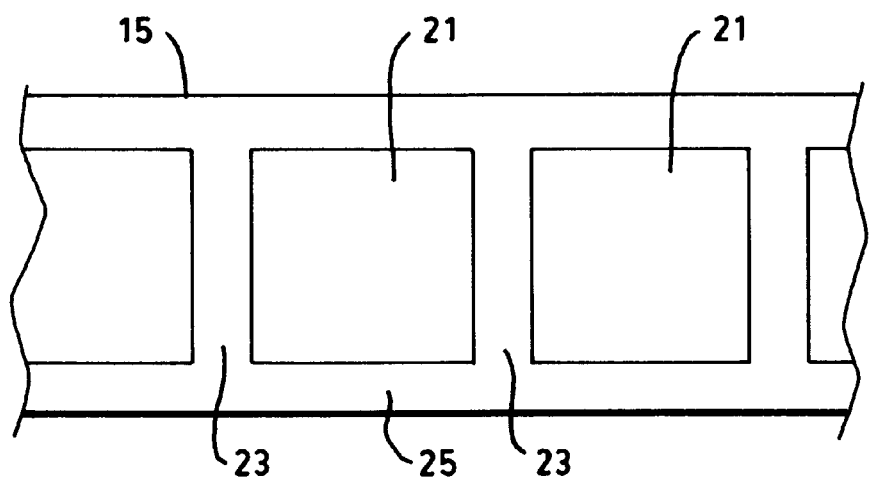
FIG. 2 is a diagrammatical view of a portion of a conventional SLM comprising a linear array of cells, showing inter-cell delimiters orthogonal to the edge of the SLM.

There is shown in FIG. 1 a diagrammatical representation of a conventional optical printer system 10 suitable for projecting a radiation pattern onto a radiation-sensitive medium 19. Optical printer system 10 typically comprises a source of optical radiation, such as LED 11, a collimating lens 13 for collimating the radiation emitted by LED 11 in at least one plane, an SLM 15, and a focusing lens 17 for imaging SLM onto medium 19. SLM 15 typically comprises a linear array of liquid crystal cells 21 wherein each cell 21 is bordered by inter-cell delimiters 23 and edge delimiters 25, as shown in FIG. 2. Inter-cell delimiters 23 are substantially orthogonal to the axis of the linear array. Delimiters 23 and 25 are non-transmissive to the radiation used for printing.

Figure 3:
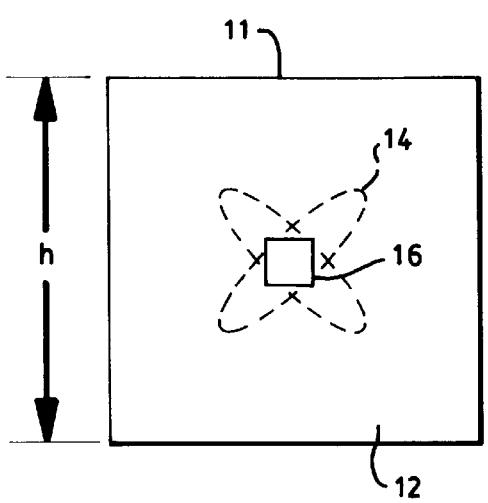
FIG. 3 is a plan view of the emitting surface of a conventional LED.

As seen in FIG. 3, LED 11, of height "h," comprises an electrode 14 and a contact pad 16 disposed near the center of an emitting surface 12. The configuration shown results in an acceptably uniform electron flow through LED 11 but produces a distinctly nonuniform radiation pattern. A graph 20 illustrating this radiation pattern is provided in FIG. 4. The intensity distribution "I" of optical radiation emitted by LED 11 is plotted as a function of transverse position "y" on LED 11. The radiation intensity is characterized by a local minimum intensity 21 in the vicinity of contact 16, local maximum intensities 23 and 25 in the regions adjacent to contact 16, a drop-off of intensity 27 near the bottom edge and a corresponding drop-off of intensity 29 near the upper edge at "h.".

Figure 4:
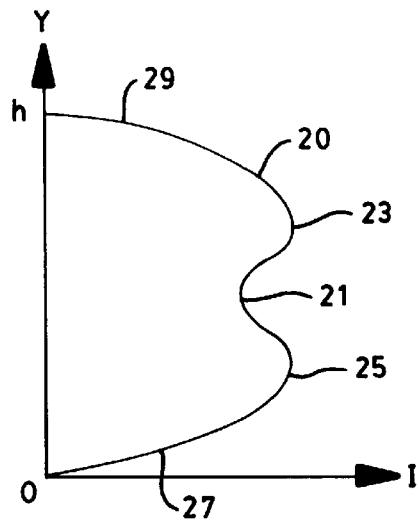
FIG. 4 is a graph showing the non-linear intensity distribution of the emission of the LED of FIG. 3.
Figure 5:
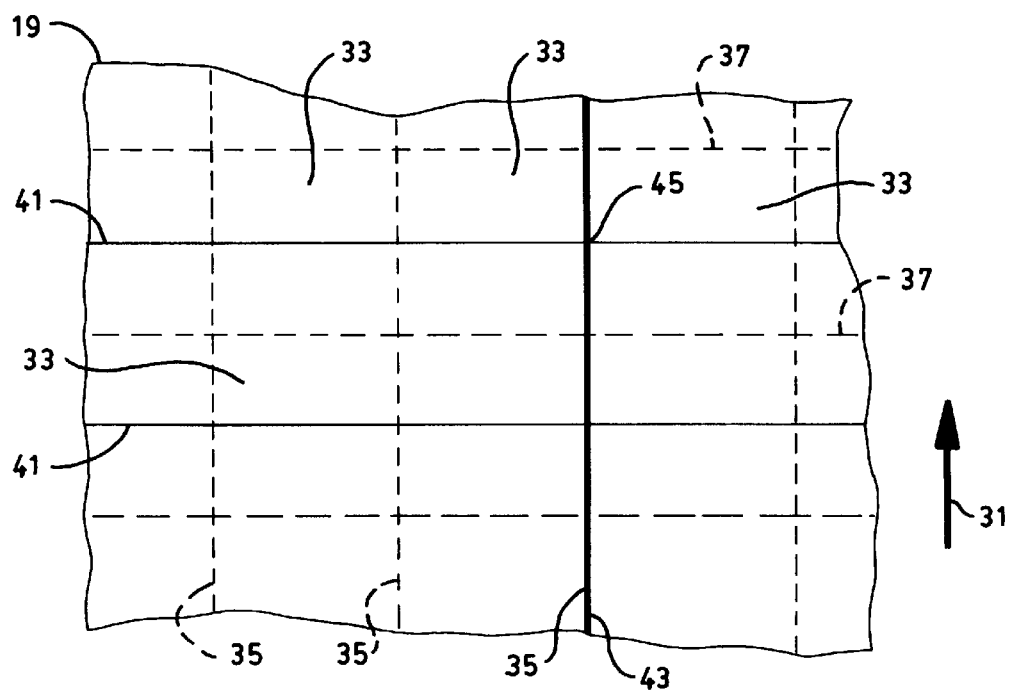
FIG. 5 is a diagrammatical view of a printing image generated by the SLM of FIG. 2 showing linear artifacts produced both in the direction of scanning and orthogonal to the direction of scanning.

When LED 11 is used as a source of radiation in conjunction with SLM 15 to produce graphical images, undesirable linear artifacts, or dark lines, are typically produced in the images. FIG. 4 represents a portion of medium 19 with such a graphical image. The transverse scanning direction is indicated by arrow 31. The graphical image comprises a two-dimensional array of pixels 33, each pixel 33 here denoted as the area lying within an adjacent pair pixel sides, represented by transverse dashed lines 35, and pixel top and bottom, represented by an adjacent pair of lateral dashed lines 37.

A first type of dark line 41 results from the non-uniform light distribution of LED 11. Dark lines 41 lie orthogonal to the direction of scanning and pass through the centers of pixels 33. A second type of dark lines 43 results from the presence of inter-cell delimiters 23 in SLM 15. Dark line 43 lies in the direction of scanning and is coincident with the common transverse edges 35 of a column of pixels 33. For clarity, only one dark line 43 is shown in the figure, but it should be understood that in a conventional optical printing system 10, there will appear a dark line 43 at the position of each transverse dashed line 35. Moreover, additional dot-like artifacts result in the graphical image at each intersection 45 because of the additive effects of dark lines 41 and 43.

In practice, the presence of linear artifacts 41 can be somewhat reduced by using more than one LED 11, each displaced in relation to one another, such that each pixel 33 substantially merges with one or more adjacent pixels. However, additional LEDs add to the cost of the printing system and decrease sharpness of the graphical image while not completely eliminating the presence of linear artifacts such as dark lines. Moreover, when using a configuration in which adjacent pixels are merged in this way, a truly "black" pixel cannot be produced when adjacent pixels are illuminated.

Description of the Preferred Embodiments

Figure 6A:
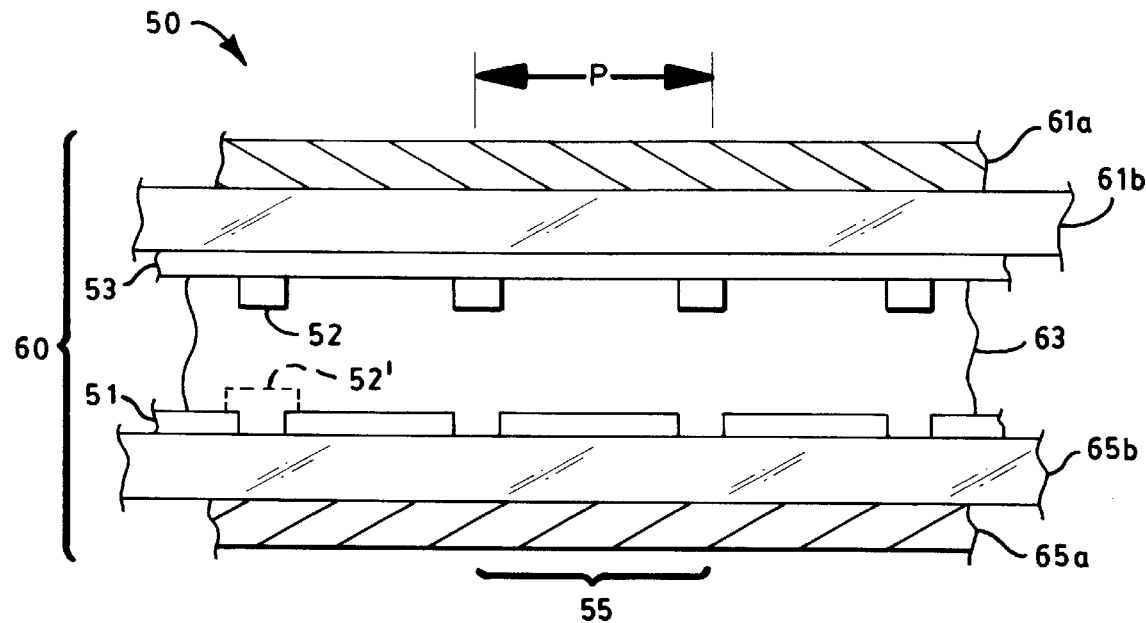
FIG. 6A is a cross-sectional view of an SLM in accordance with the present invention.
Figure 6B:
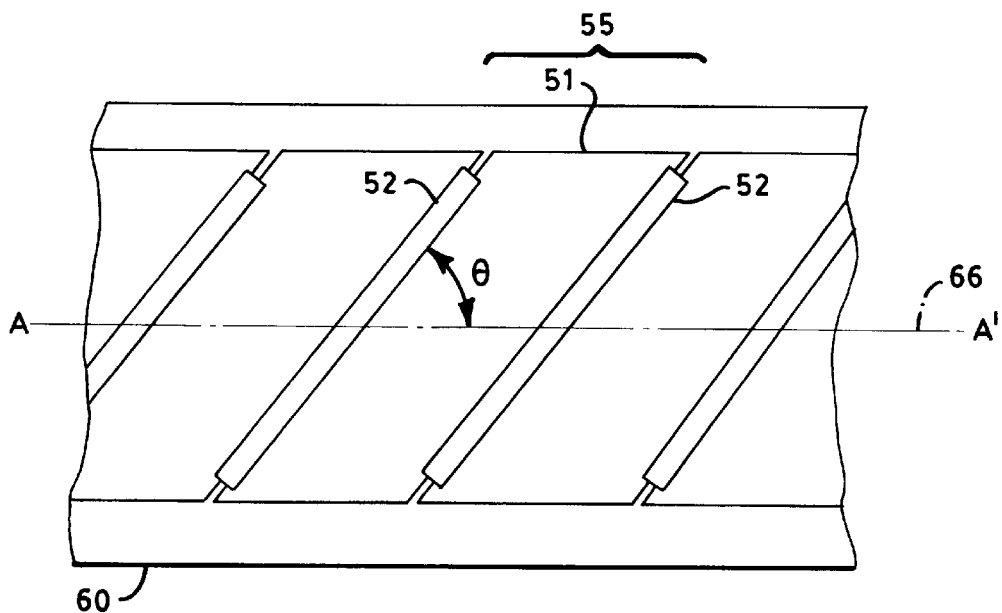
FIG. 6B is a diagrammatical view of a first embodiment of the SLM of FIG. 6A comprising a linear array of cells, showing inter-cell delimiters oriented at an acute angle to the edge of the SLM.

Referring now to FIGS. 6A and 6B, there is shown a first embodiment of an SLM 50, in accordance with the present invention, comprising a plurality of electronic shutters or cells 55, here configured as a linear array with periodic spacing "P," formed in a substrate 60. Inter-cell delimiters 52, non-transmissive to the optical radiation, are disposed between corresponding pairs of cells 55 and are oriented at an acute angle ($\theta$) with respect to a lateral array axis 66. Each cell 55 is independently controllable by application of an electrical signal to a first transparent electrode 51. In the figure, each first transparent electrode 51 is shown as having the shape of a parallelogram. The parallelogram geometry is particularly convenient for illustration in the analysis which follows, but it should be understood that the invention is not limited to this geometry, as will be explained in greater detail below.

FIG. 6A provides a cross-sectional view of SLM 50 taken along section A–A' (i.e., array axis 66). In a preferred embodiment, substrate 60 comprises a first polarizing layer 61a, a first planar sheet 61b, a liquid crystal layer 63, a second planar sheet 65b, and a second polarizing layer 65a. Planar sheets 61b and 65b are transmissive to the optical radiation and can be fabricated from material which may be flexible or rigid. Although inter-cell delimiters 52 are here shown as disposed upon a second transparent electrode 53 and between cells 55, in an alternative configuration, delimiters 52 may be disposed on first transparent electrodes 53 and between cells 55, as indicated at 52'.

Second transparent electrode 53 serves as a ground plane for one or more cells 55. With this configuration, cell 55 can be placed into one of at least two states by the application of an electrical signal from external circuitry (not shown), as is well-known in the relevant art. In the first state, cell 55 is transmissive to incident optical radiation and, in the second state, cell 55 is non-transmissive to the optical radiation. The electrical signal is applied to the first transparent electrode of a selected cell 55 and serves to control the degree of transmissiveness of selected cell 55 to the optical radiation when SLM 50 is used for printing or other scanning functions. In the preferred embodiment, cells 55 are binary and panchromatic liquid crystal cells, that is, selectable to be either substantially transmissive or non-transmissive to optical radiation.

In accordance with accepted convention, cell 55 is considered to be in an "ON" state when transmissive to optical radiation, and in an "OFF" state when non-transmissive. One skilled in the art will understand that, in alternative embodiments, SLM 50 may comprise cells having continuously-variable degrees of optical radiation transmissiveness without detriment to the object of the invention. To provide for a color image, SLM 50 transmits colored optical radiation generated by colored LEDs (not shown). The color intensity, or brightness, produced at the radiation-sensitive medium is a function of the duration of time in which cell 55 is maintained in the ON state.

Figure 7:
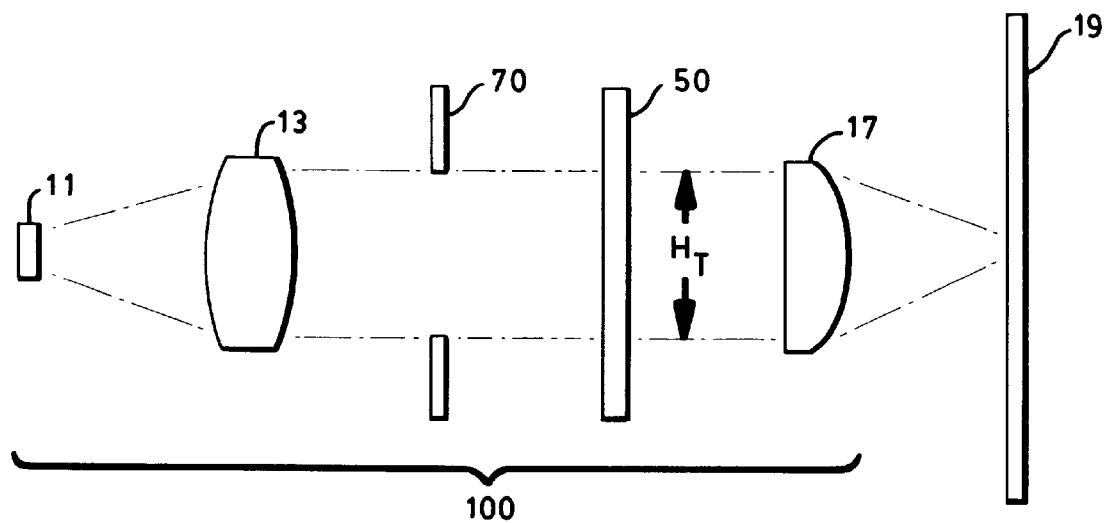
FIG. 7 is a diagrammatical view of one embodiment of an optical system comprising an SLM in accordance with the present invention, the system suitable for use in an optical printer.
Figure 8:
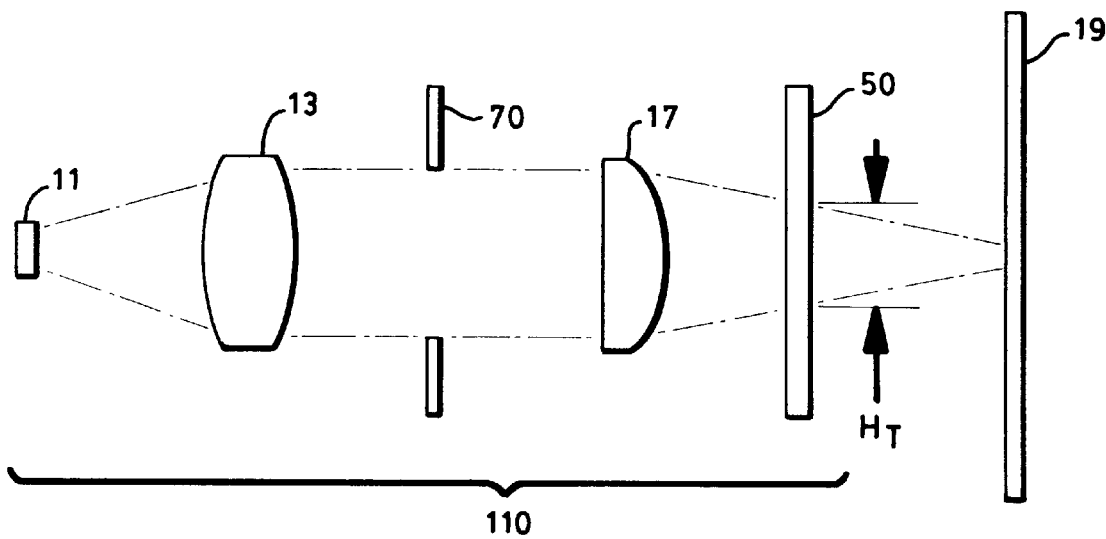
FIG. 8 is a diagrammatical view of an alternative embodiment of the optical system of FIG. 7.

Acute angle θ is related to the effective transverse height of the beam of optical radiation passing through SLM 50. FIG. 7 shows an optical printing system 100 comprising LED 11, collimating lens 13, SLM 50, and focusing lens 17, for imaging either LED 11 or SLM 50 onto medium 19. Any radiation having an optical path lying within the effective transverse beam height $H_T$ will be projected onto medium 19. In this configuration, the effective transverse beam height $H_T$ is determined by the size and placement of an optional aperture stop 71. In an alternative embodiment, shown in FIG. 8, an optical printing system 110 comprises SLM 50 positioned between focusing lens 17 and medium 19. Although optional aperture stop 70 is shown in FIGS. 7 and 8 as positioned adjacent collimating lens 13, it will be appreciated by one skilled in the relevant art that aperture stop 70 can be placed at essentially any position along the optical path between LED 11 and medium 19, including placement on SLM 50 as a masked region, without detriment to the invention.

Figure 9:
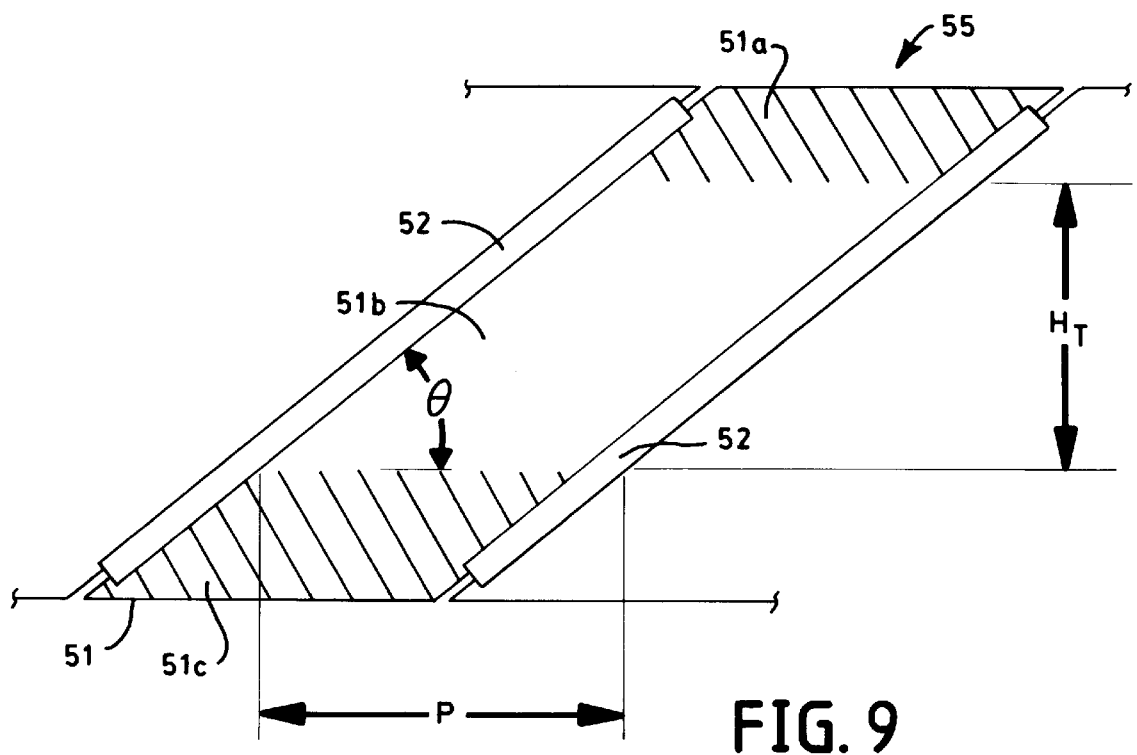
FIG. 9 is a diagram showing an irradiated cell of an SLM and illustrating the relationship between the transverse height of an incident beam of radiation, the periodic spacing of the array of cells, and the angle of the delimiter with respect to the array axis.

The relationship between acute angle θ, transverse beam height $H_T$, and periodic spacing P can be quantitatively derived with reference to FIG. 9. Cell 55 is irradiated by a beam of optical radiation having an effective transverse beam height $H_T$. The area of irradiation is represented by an irradiated portion 51*b* of first transparent electrode 51, where cross-hatched areas 51*a* and 51*c* represent those portions of first transparent electrode 51 not irradiated by the incident beam. By inspection, it can be seen that the tangent of acute angle θ (i.e., tan θ) is equal to the transverse beam height $H_T$ divided by the periodic spacing P (i.e., $H_T/P$). In the preferred embodiment, transverse beam height $H_T$ is approximately 1.5 mm, periodic cell spacing P is approximately 162 μm, and acute angle θ is substantially eighty-four degrees (84°).

Figure 10:
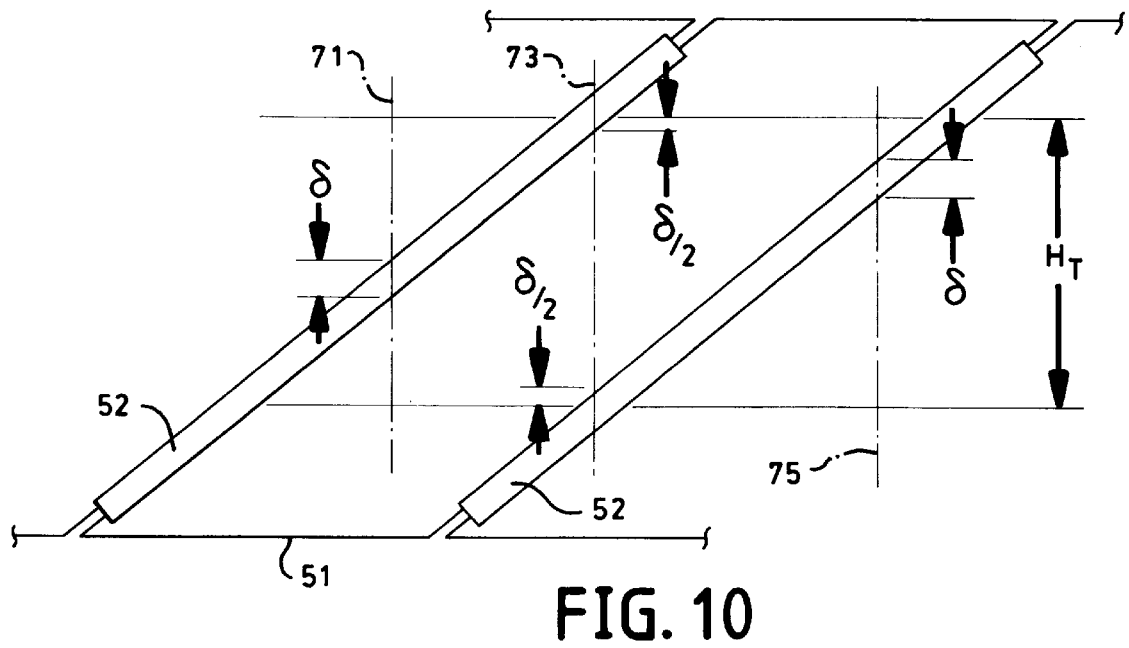
FIG. 10 is a further diagram of the SLM cell of FIG. 9 illustrating the criterion for determining the angular orientation and spacing of delimiters.

It can further be seen, with reference FIG. 10 that because of this relationship, it holds that, within the distance interval $H_T$, each of transverse planes 71, 73, and 75 (or any other such transverse plane) passes through one or two inter-cell delimiters 52 for a distance of "δ," and passes through one or two first transparent electrodes 51 for a distance of ($H_T$–δ). The uniformity of optical radiation transmitted through array of cells 55 is thus not affected by the presence of inter-cell delimiters 52. In accordance with the present invention, an SLM having cells conforming to this geometry can be advantageously utilized in an optical printing system to produce graphical images without incurring linear artifacts lying parallel to the direction of scanning.

Figure 11:
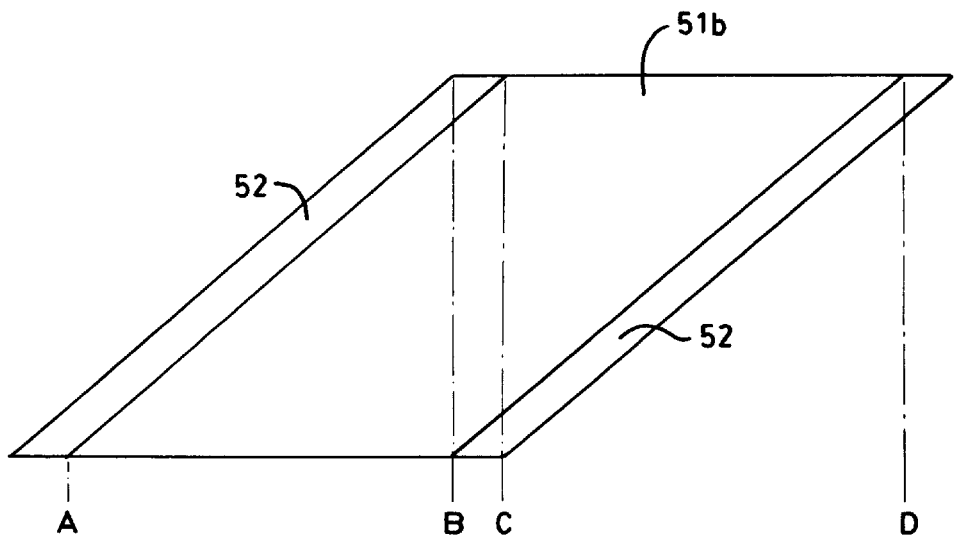
FIG. 11 is a simplified diagram of the irradiated region of an SLM cell.
Figure 12:
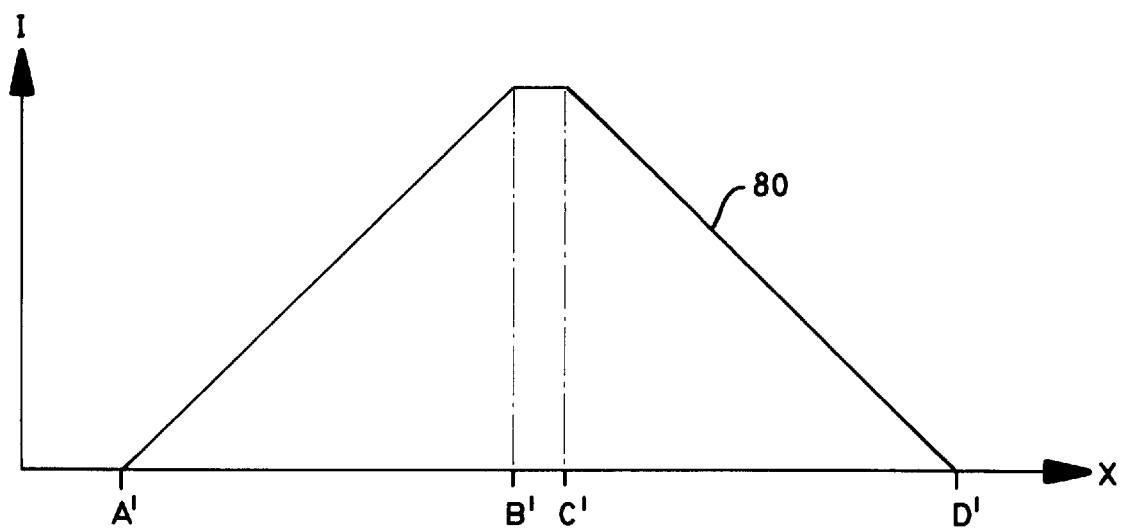
FIG. 12 is a graph illustrating the intensity distribution on a print medium of radiation transmitted by an open SLM cell, or shutter.

The advantage provided by an SLM conforming to the geometry disclosed above can best be explained with reference to FIG. 11 in which a simplified representation of irradiated portion 51*b* is shown to illustrate the intensity distribution of radiation passing through cell 55 when transmissive. Graph 80, in FIG. 12, represents the intensity of optical radiation projected onto medium 19 by irradiated portion 51*b* as a function of lateral position ("Y"). The intensity of projected radiation is zero at point "A" on irradiated portion 51*b*, as represented by corresponding point A' on graph 80. The intensity increases to a relative maximum at point B on irradiated portion 51*b*, remains at a constant level to point C, and decreases linearly to zero at point D. This transmission profile corresponds to points B', C', and D' on graph 80. With such a radiation distribution at medium 19, there is produced an overlap of pixels which serves to effectively eliminate the generation of linear artifacts lying in the lateral direction of scanning.

Figure 13:
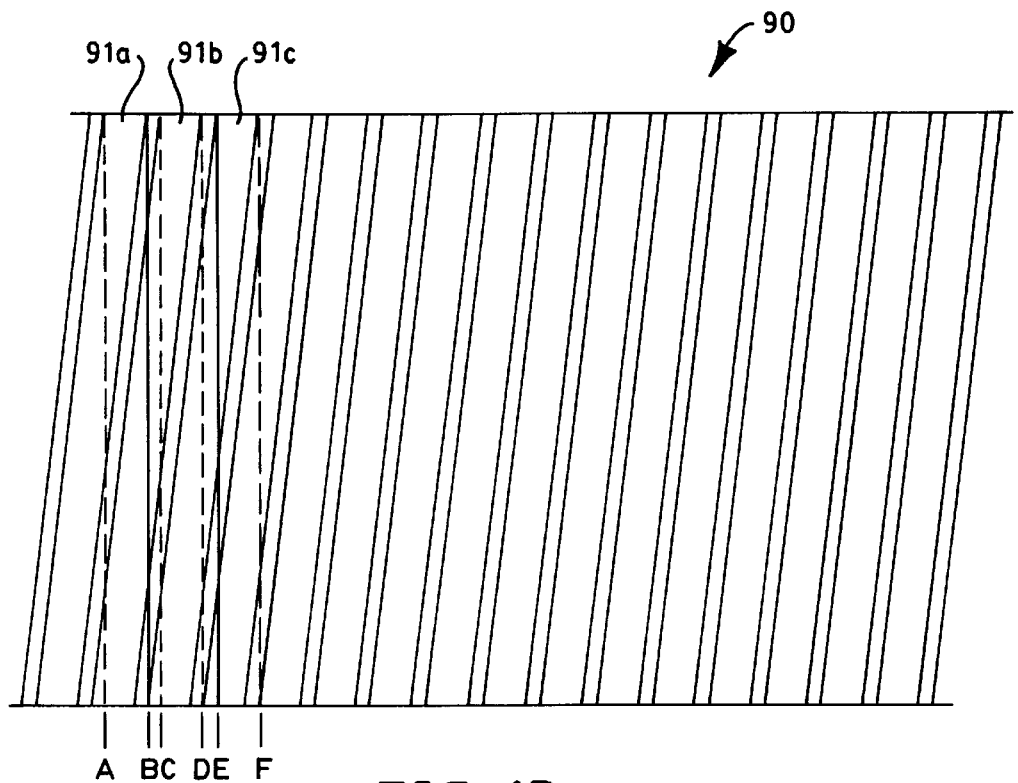
FIG. 13 is a simplified diagrammatical view of an array of elongated cells comprising an SLM in accordance with the present invention.
Figure 14:
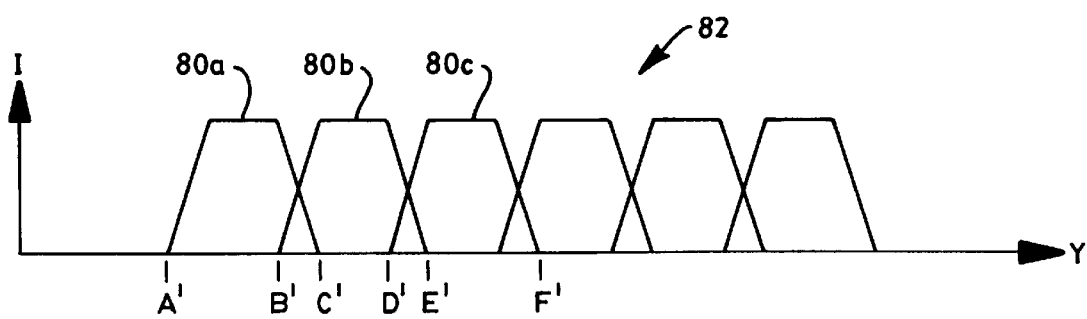
FIG. 14 is a graph illustrating the uniform cumulative radiation pattern produced by the SLM of FIG. 13 when all cells are in a transmissive state.

The cumulative effect of pixel overlapping produces an essentially uniform distribution of radiation along the transverse x-direction when all cells are ON. This is best explained with reference to FIGS. 13 in which there is shown an SLM 90 in accordance with the present invention comprising a linear array of irradiated transparent electrode portions 91*a*, 91*b*, and 91*c*, all in the ON state. The corresponding radiation intensity distribution is represented by a cumulative graph 82, in FIG. 14, which comprises the additive sum of individual graphs 80*a*, 80*b*, and 80*c* corresponding to portions 91*a*, 91*b*, and 91*c* respectively. The radiation transmission of portion 91*a*, indicated at points A to C in FIG. 13, extends from point A' to C' of graph 80*a*. Similarly, the radiation transmission of portion 91*b*, indicated at points B to D in FIG. 13, extends from point B' to D' of graph 80*b*. There is overlap in the region between B' and C' with a cross-over at 50% levels. The additive effect of the overlapping produces the essentially uniform radiation distribution, and eliminates the presence of linear artifacts on a graphical image projected onto medium 19.

Figure 15:
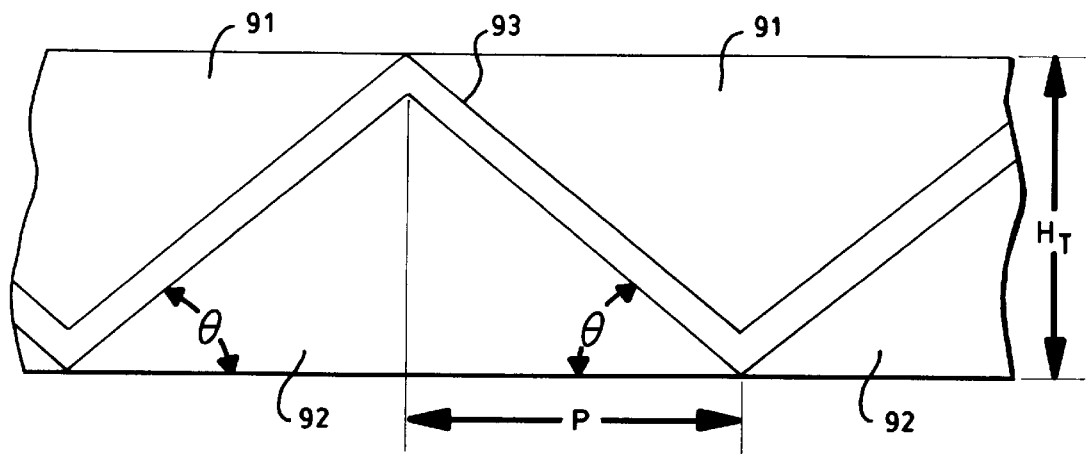
FIG. 15 is a diagrammatical view of a second embodiment of the SLM of FIG. 11.
Figure 16:
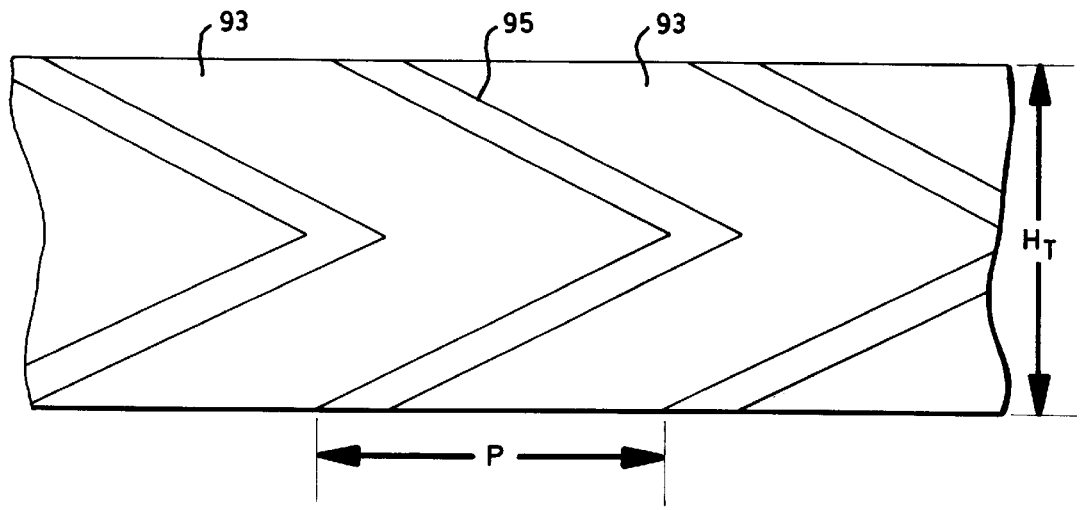
FIG. 16 is a diagrammatical view of a third embodiment of the SLM of FIG. 11.

Other cell and inter-cell delimiter geometries meeting the criterion illustrated in FIG. 10 can be used to produce essentially uniform lines of optical radiation on medium 19. For example, SLM 50 may comprise triangular-shaped irradiated portions 91 and 92 with a continuous inter-cell delimiter 93 disposed between, as in FIG. 15. Alternatively, SLM 50 may comprise herringbone-shaped irradiated portions 93 with a vee-shaped inter-cell delimiter 95 disposed between.

Figure 17:
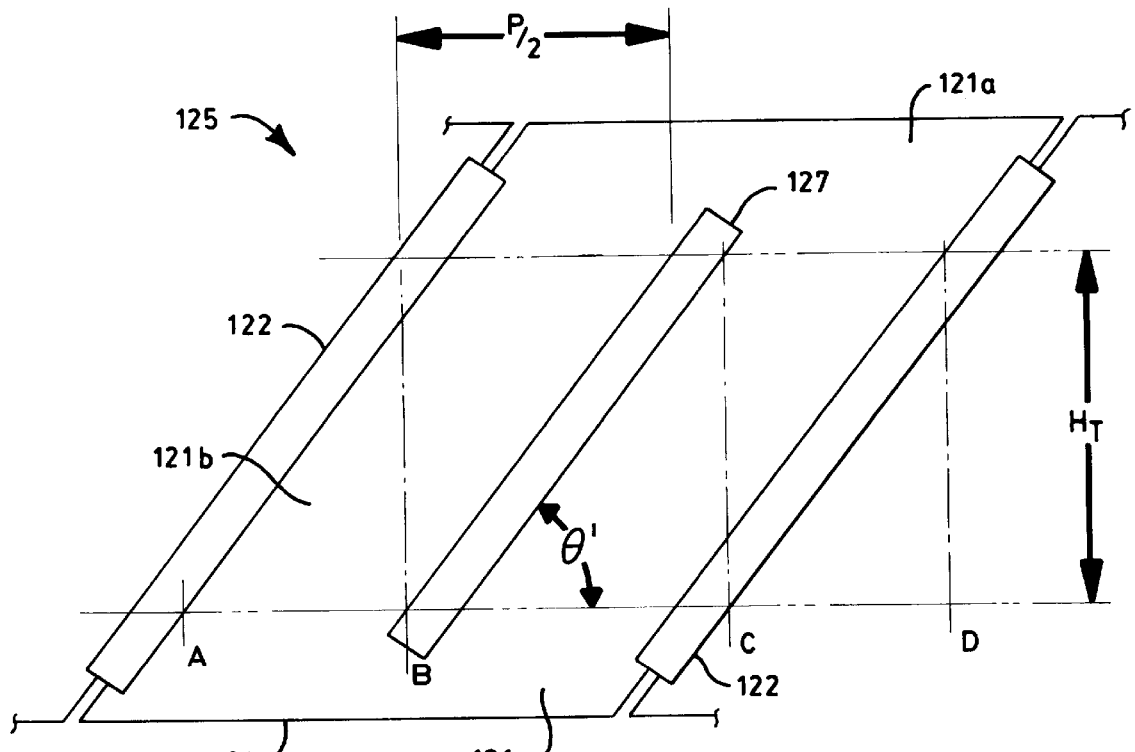
FIG. 17 is a diagrammatical view of a fourth embodiment of an SLM comprising strip masks disposed upon cells, in accordance with the present invention.

There is shown in FIG. 17 an alternative embodiment of an SLM, in accordance with the present invention, comprising an array of cells 125 of which a single cell 125 is shown. Cell 125 comprises a first transparent electrode 121, inter-cell delimiters 122, and at least one strip mask 127 of sufficient length to extend across the distance interval $H_T$. In the example provide, strip mask 127 is disposed on electrode 121 positioned essentially parallel to and equidistant from inter-cell delimiters 122. Placement of strip mask 127 as shown reduces the effective periodic spacing to P/2. Accordingly, inter-cell delimiters 122 are oriented at an acute angle θ' to the array axis, where tan (θ') is equal to (2$H_T/P$). For an embodiment comprising "k" strip masks 127 equidistantly disposed on each electrode 121, strip masks 127 and inter-cell delimiters 122 are oriented at an angle φ to the array axis where tan (φ) is equal to (k$H_T/P$).

Figure 18:
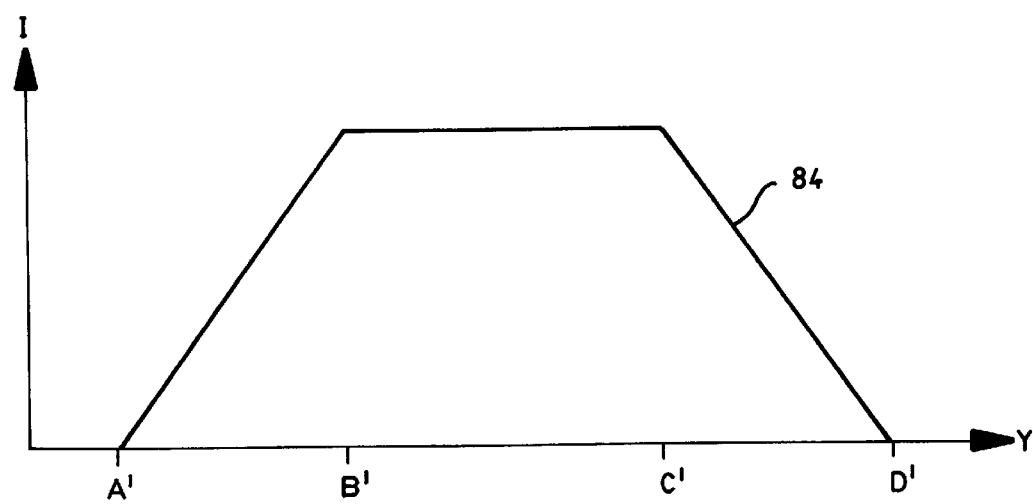
FIG. 18 is a graph showing the intensity distribution of the emission from an irradiated cell of FIG. 17.

Linear mask 127 serves to provide a uniform optical radiation distribution across a pixel, but with a narrower pixel base for better sharpness, or Modulation Transfer Function (MTF). Using one or more linear masks 127 as described above provides uniform optical radiation intensity across the pixel while enabling placement of inter-cell delimiters 122 at a greater angle to the array axis. This results in a shorter base of optical radiation distribution 84, shown in FIG. 18, which approximates a more rectangular shape, the overlap between neighboring pixels decreases, and a sharper image results.

Figure 19:
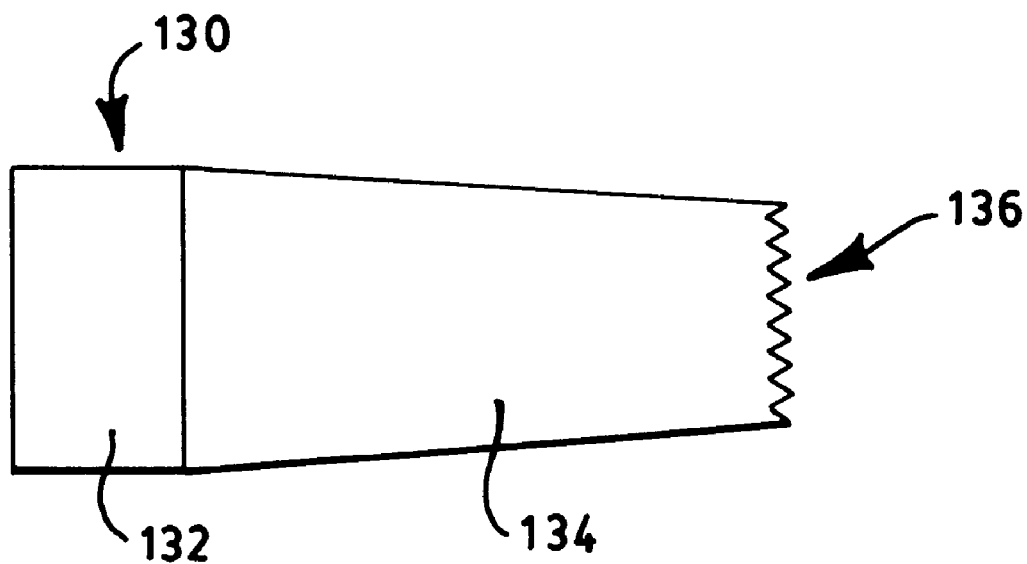
FIG. 19 is a diagrammatical view of a source of optical radiation comprising an optical waveguide.
Figure 20:
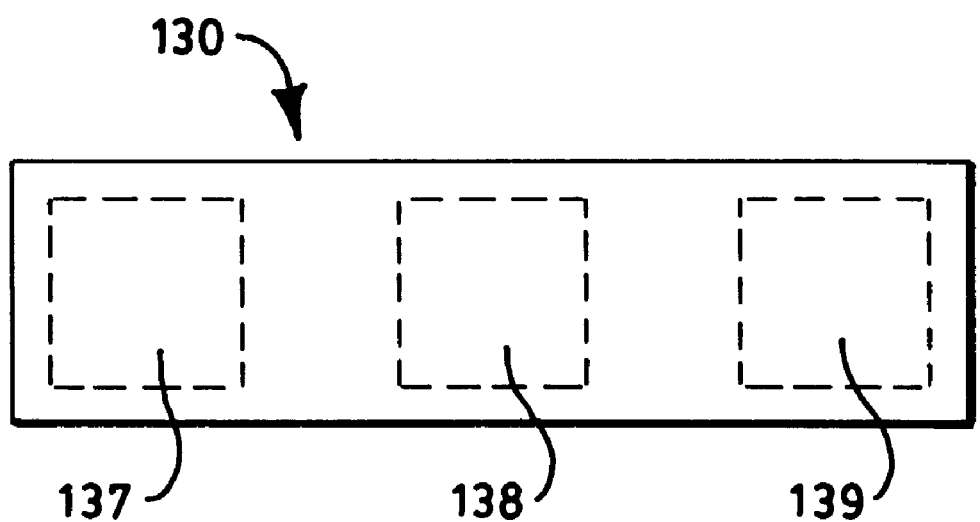
FIG. 20 is an end view of the LED array of FIG. 19.

FIGS. 19 and 20 illustrate an embodiment of the invention by which linear artifacts orthogonal to the scanning direction are reduced or eliminated. A print head 130 comprises an array 132 of LEDs. Array 132 comprises of a red LED 137 horizontally displaced from a green LED 138 which is in turn horizontally displaced from a blue LED 139. One skilled in the art will realize that the order of LEDs within array 132 and the amount of horizontal displacement are design specific depending upon variables such as the distance between printed pixels (as will be described later herein), for example, and the space between the SLM and the film. In a generalized system, LEDs 137, 138, and 139 are disposed in optical alignment with an optical waveguide 134.

Optical waveguide 134 is configured to provide total internal reflection of optical radiation from array 132 such that optical radiation projected from the array 132 is optically conducted to a diffused surface 136. In the preferred embodiment, diffused surface 136 is ground or centiculated in a single direction, horizontal, so as to diffuse optical radiation vertically, in the transverse, scanning direction only.

Diffused surface 136 acts to vertically diffuse such individual beams of optical radiation from array 132 such that the optical radiation distribution of individual beams in the transverse direction is substantially uniform. Diffused surface 136 averages the optical radiation intensity across the individual beam to substantially reduce the contrast between the highs and lows, previously described.

Figure 21:
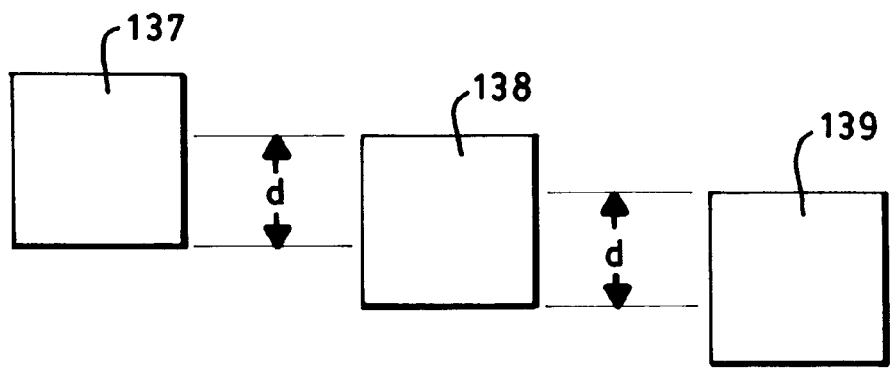
FIG. 21 is a diagrammatical view of an LED array in which there is provided an offset between adjacent LEDs.

Referring now to FIG. 21, the previously illustrated embodiment achieves the initial goal of minimizing horizontal line defects. However, image quality can be further enhanced by ensuring proper color registration. That is, since there is relative movement between the print head and the photosensitive medium upon which the image is being printed, consecutive color lines will be vertically displaced causing non-overlapping colors, or lack of color registration.

LEDs 137, 138, 139 are therefore displaced relative to one another to achieve this registration. That is, a horizontal axis of red LED 137 is displaced relative to the horizontal axis of green LED 138. This vertical displacement "d" is defined by the dashed lines. Vertical displacement d compensates for relative movement between the print head and the print medium during the time interval that one line of an individual color is imaged.

Displacement d is one third of the height of a printed line. Generally however, vertical displacement d is a function of the number of colors being used in the imaging system. Thus, the vertical displacement will be the dimension (1 line/C), where C is the number of colors used. Since the illustrative example is that of a three-color RGB system, the vertical displacement is one-third of a print line.

Figure 22:
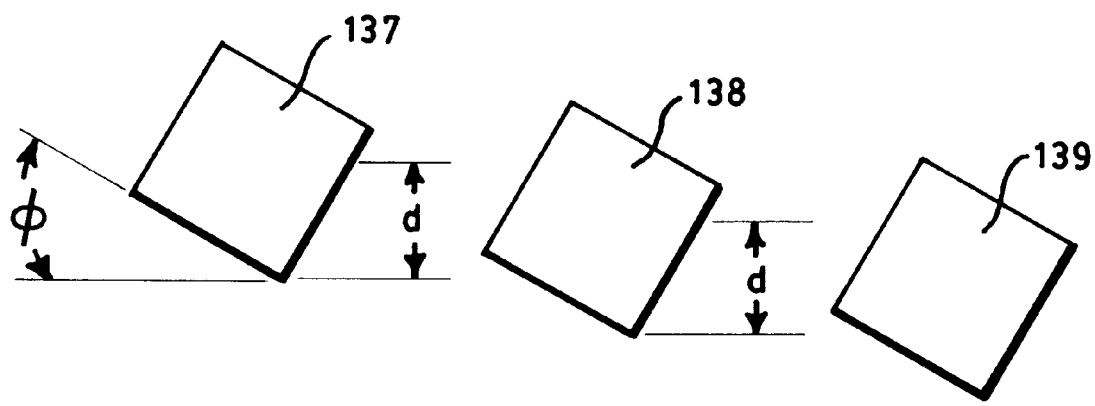
FIG. 22 is a diagrammatical view of an LED array oriented at an angle φ to a scanned line.

Referring now to FIG. 22, an alternative embodiment of array 132 is shown. In this embodiment, the array of LEDs 137, 138, and 139 is tilted to achieve the desired effect. LEDs 137, 138, and 139 are fabricated to be substantially parallel to each other, but print head 130, or array 132, is rotated by an angle φ relative to the lateral axis of the optical system. Angle φ is specified such that the centers of LEDs 137, 138, and 139 are displaced d by an amount equal to 1/C, or one third in this example, to achieve proper color registration.

Figure 23:
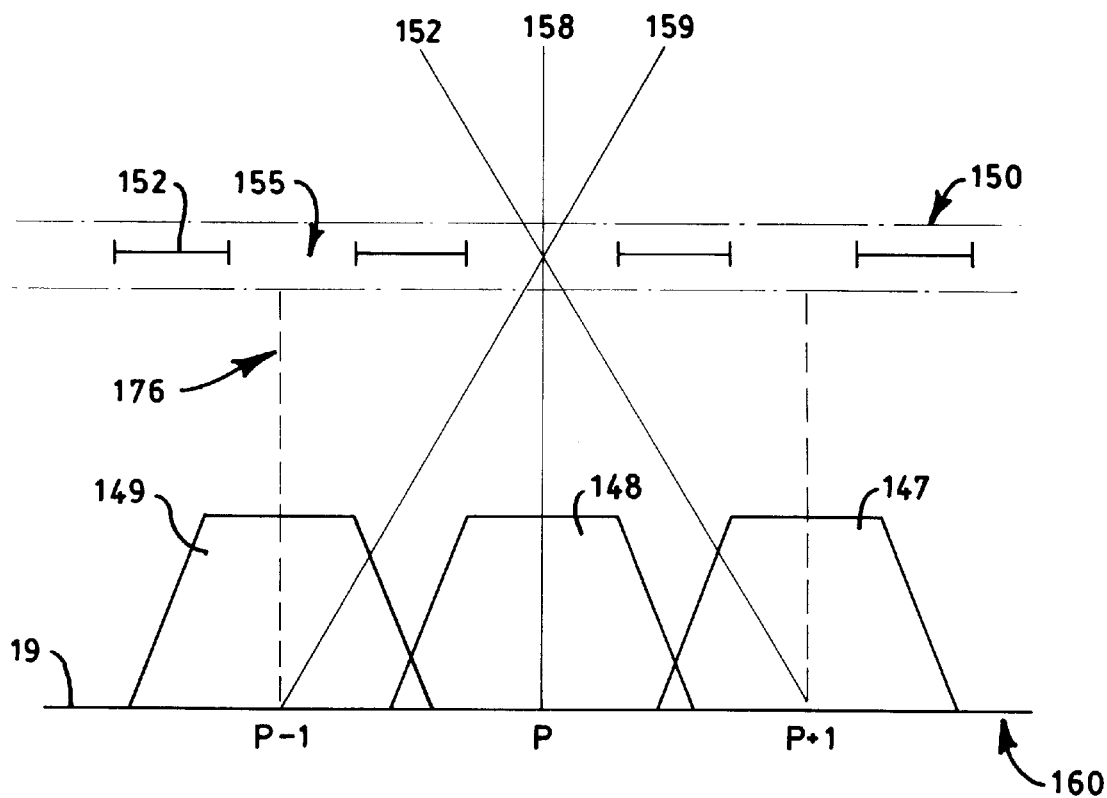
FIG. 23 is a diagrammatical view illustrating the placement of radiation sources diagram for the LEDs of FIG. 21.

While it is possible to use the foregoing invention with vertically disposed LEDs as is commonly known in the art, FIG. 23 illustrates the preferred embodiment where LEDs 137, 138, and 139 are horizontally disposed. The horizontal separation between LEDs 137, 138, and 139 results in a horizontal displacement of pixels 149, 148, and 147 on photosensitive medium 19. To illustrate, optical radiation from each of LEDs 137, 138, and 139 is shown passing through a single cell 155 in SLM 150. Light 157, 158, and 159 from each of LEDs 137, 138, and 139 respectively projects three pixels 147, 148, and 149 through cell 155. Each pixel 134, 136, 138 has a relative displacement of one pixel width (P). That is, light from red LED 137 will project along line 157 to expose a pixel 147 at position P+1; the light from green LED 138 will project along line 158 to expose a pixel 148 at position P; and the light from blue LED 139 will project along line 159 to expose a pixel 149 at P−1. The angles of propagation are exaggerated for the sake of illustration. In practice, the angle is the tangent of the center-to-center separation of the cells in the SLM divided by the distance from the SLM to the photosensitive medium. In this embodiment, the angle is tan (0.162/0.170)=0.93°≈1°, i.e., substantially one degree.

In this illustration, axis 160 is that of position on a line a direction orthogonal to the scan direction. Delimiters 152 define cells 155 in spatial light modulator 150. In the preferred embodiment, delimiters 152 are on the order of 0.001 inches in width, and cells 155 are on the order of 0.004 inches in width.

Figure 24:
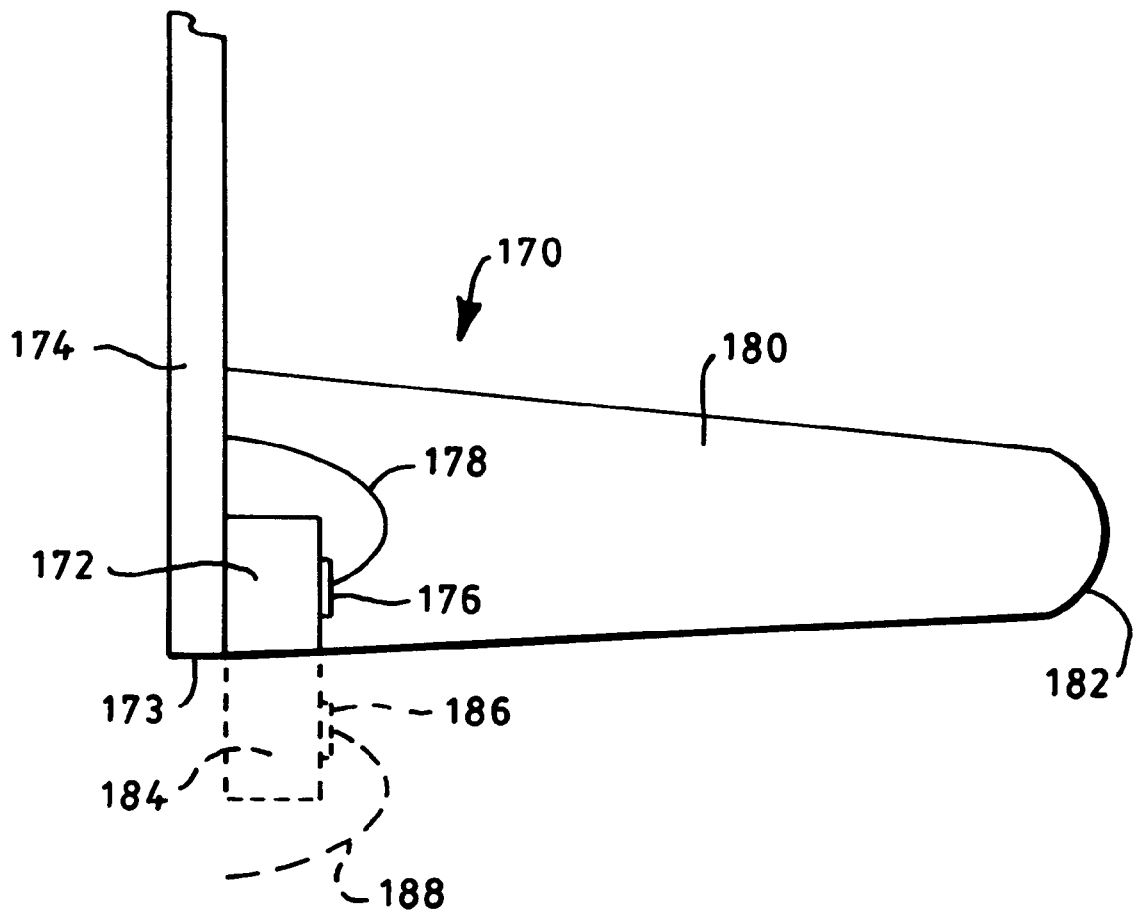
FIG. 24 is a diagrammatical view of an alternative optical print head in accordance with the present invention.

Referring now to FIG. 24, there is shown an alternative embodiment of a print head 170 designed in accordance with the present invention. In this embodiment, an array 172 of LEDs is mounted along an edge 173 of a printed circuit board 174. Array 172 comprises an electrical contact 176 to which a bond wire 178 is attached. This configuration is substantially similar for each of the LEDs in array 172.

Array 172 is encased within an optical waveguide 180, preferably fabricated of an epoxy. Optical waveguide 180 is substantially flush with an edge of array 172 which, in turn, is substantially flush with edge 173 of printed circuit board 174. Optical waveguide 180 is formed so as to extend over bond wire 178. Bond wire 178 is generally an extremely thin wire that is subject to breakage. By forming optical waveguide 180 over bond wire 178, optical waveguide 180 serves to reinforce bond wire 178, thereby increasing yield rates during fabrication of print head 170.

Optical waveguide 180 is terminated at a distal end by a cylindrical lens 182. Preferably, cylindrical lens 182 is formed as an integral part of optical waveguide 180. Cylindrical lens 182 serves to gather light from optical waveguide 180 and direct the light along the optical path while decreasing light reducing backscatter. Orientation of array 172 along edge 173 and placement of optical waveguide 180 along edge 173 causes a virtual image 184 of array 172 to be projected from optical waveguide 180. Virtual image 184 includes an image 186 of electrical contact 176 and an image 188 of bond wire 178. Virtual images 184, 186, and 188 are mirrored relative to the real images to achieve an optical symmetry in emission.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A spatial light modulator suitable for responding to a received electrical signal and thereby modulating an incident beam of optical radiation so as to project a pattern of radiation onto a medium, said spatial light modulator comprising:

a substrate electrically-selectable between a first state in which said substrate is transmissive to the optical radiation and a second state in which said substrate is non-transmissive to the optical radiation, said substrate comprising a first surface and a second surface;

a transparent ground-plane electrode disposed upon said first surface;

a plurality of transparent electrodes disposed in a linear array upon said second surface such that a corresponding array of cells is formed defining an array axis, each said cell comprising said first and second states, the state of a selected said cell being determined by transmittal of the electrical signal to said selected cell transparent electrode; and, a plurality of strip regions non-transmissive to the optical radiation, each said non-transmissive strip region disposed between a corresponding pair of adjacent said cells and oriented at an acute angle ($\theta$) with respect to said array axis, said angle lying within a plane defined by one of said surfaces.

2. The spatial light modulator according to claim 1 wherein said substrate comprises a liquid crystal layer.

3. The spatial light modulator according to claim 1 wherein said angle ($\theta$) is substantially 84°.

4. The spatial light modulator according to claim 1 further comprising a plurality of strip masks, each said strip mask disposed upon a corresponding said cell, each said strip mask positioned essentially parallel to and equidistant from a nearest pair of said non-transmissive strip regions.

5. The spatial light modulator according to claim 4 wherein said strip mask comprises an opaque material disposed upon said cell.

6. The spatial light modulator according to claim 4 wherein the width of said strip mask is essentially equal to the width of said non-transmissive strip region.

7. The spatial light modulator according to claim 4 wherein said angle ($\theta$) is substantially 87°.

8. An exposure system suitable for use in an optical printer adapted to project a pattern of optical radiation onto a radiation-sensitive print medium in response to an electrical signal, said exposure system comprising:

an optical radiation source producing a beam of radiation having a defined transverse height ($H_T$);

a spatial light modulator comprising:
a substrate,
a plurality of cells formed in said substrate, said cells disposed in an array having a periodic spacing (P) and defining an array axis, each said cell comprising at least two states, a first state in which said cell is transmissive to said beam of radiation and a second state in which said cell is non-transmissive to said beam of radiation, said cell states selectable by correspondence with the electrical signal;

a plurality of strip regions non-transmissive to the optical radiation, each said non-transmissive strip region disposed between a corresponding pair of adjacent said cells at an angle ($\theta$) with respect to said array axis, where the tangent of said angle ($\tan \theta$) is substantially equal to said beam transverse width divided by said periodic spacing ($W_T/P$); and means for focusing onto the radiation-sensitive print medium the optical radiation transmitted through said plurality of cells.

9. The exposure system according to claim 8 wherein said optical radiation source comprises at least one light-emitting diode.

10. The exposure system according to claim 8 wherein said cell comprise a liquid crystal cell.

11. The exposure system according to claim 8 wherein said angle ($\theta$) is substantially 84°.

12. The exposure system according to claim 8 further comprising a plurality of strip masks comprising a material non-transmissive to said beam of radiation, each said strip mask disposed upon a corresponding said cell, each said strip mask positioned essentially parallel to and equidistant from a nearest pair of said non-transmissive strip regions.

13. The exposure system according to claim 12 wherein the width of said strip mask is essentially equal to the width of said non-transmissive strip region.

14. The exposure system according to claim 12 wherein said angle ($\theta$) is substantially 87°.

15. The exposure system according to claim 8 further comprising an optical waveguide disposed generally parallel to said array axis, said optical waveguide comprising an input port adapted to receive said linear pattern of radiation, and an output port comprising a diffusing surface, such that said diffusing surface scatters said linear pattern of radiation in a direction transverse to said array axis.

16. The exposure system according to claim 12 further comprising an aperture stop.

\* \* \* \* \*